Figure 1:
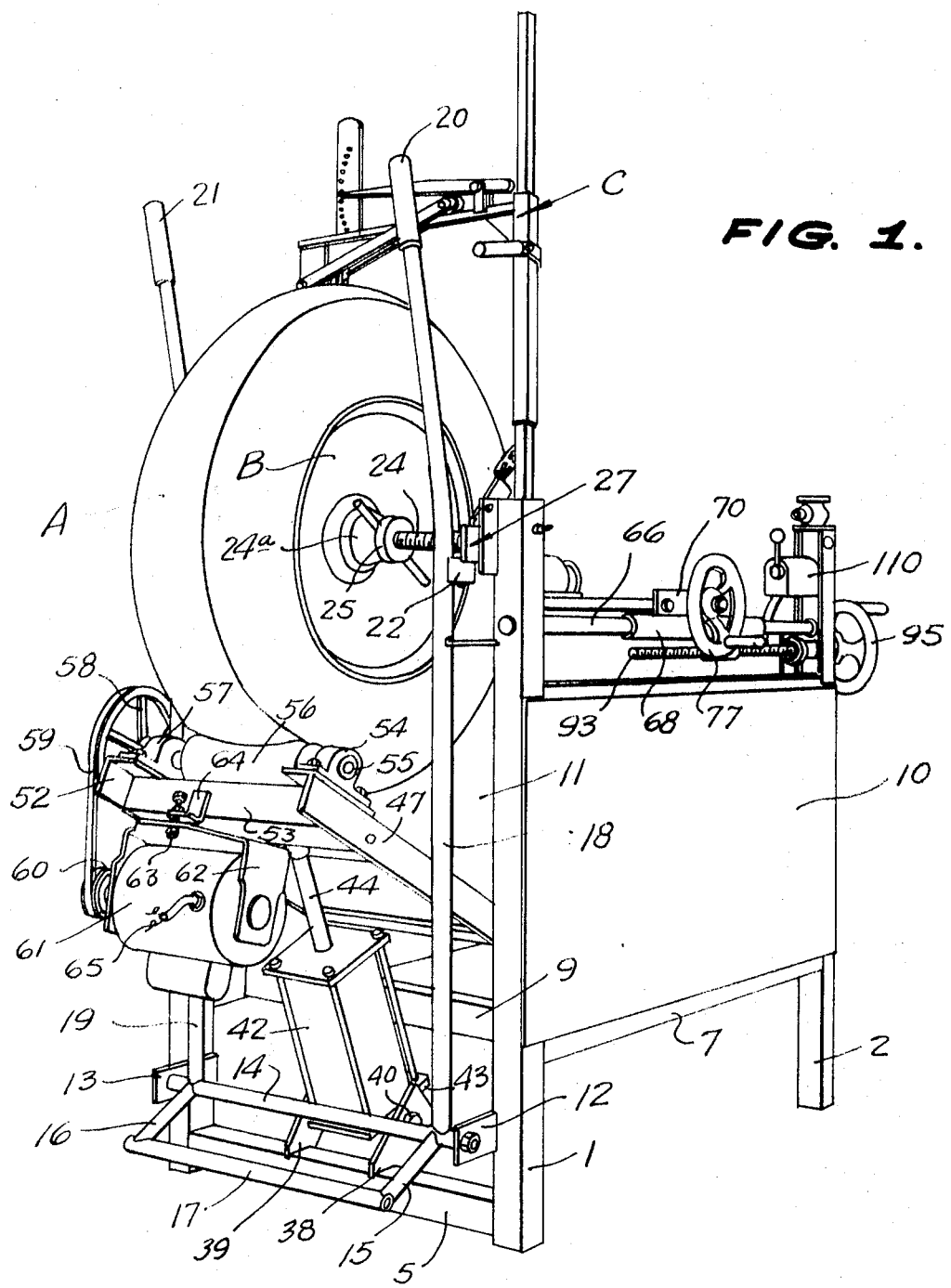

United States Patent

[11] 3,595,295

[72] Inventor  Kenneth D. Curry
               P.O. Box 1856, Hattiesburg, Miss. 39401
[21] Appl. No. 815,461
[22] Filed     Apr. 11, 1969
[45] Patented  July 27, 1971

[54] TIRE TREAD TRIMMING AND TRUING APPARATUS
     7 Claims, 4 Drawing Figs.
[52] U.S. Cl. .................................................. 157/13
[51] Int. Cl. ................................................... B29h 21/08
[50] Field of Search ...................................... 157/13

[56]             References Cited
              UNITED STATES PATENTS
2,925,125  2/1960   Curry ........................... 157/13
2,979,123  4/1961   Frohlich et al. ................ 157/13
3,152,632  10/1964  Clapp ........................... 157/13
3,354,929  11/1967  French .......................... 157/13

Primary Examiner—Granville Y. Custer, Jr.
Attorney—Linton & Linton

ABSTRACT: The apparatus is for rounding the tread of tires to give the tread a perfect annular configuration as well as a lateral arc which is the same entirely around the tread of the tire and includes a tire loading and unloading means, a tire-rotating and tread-flexing means for both flexing the tire before trimming and rotating the tire during trimming and guided means for trimming the tire tread to the desired configuration.

INVENTOR.
KENNETH D. CURRY

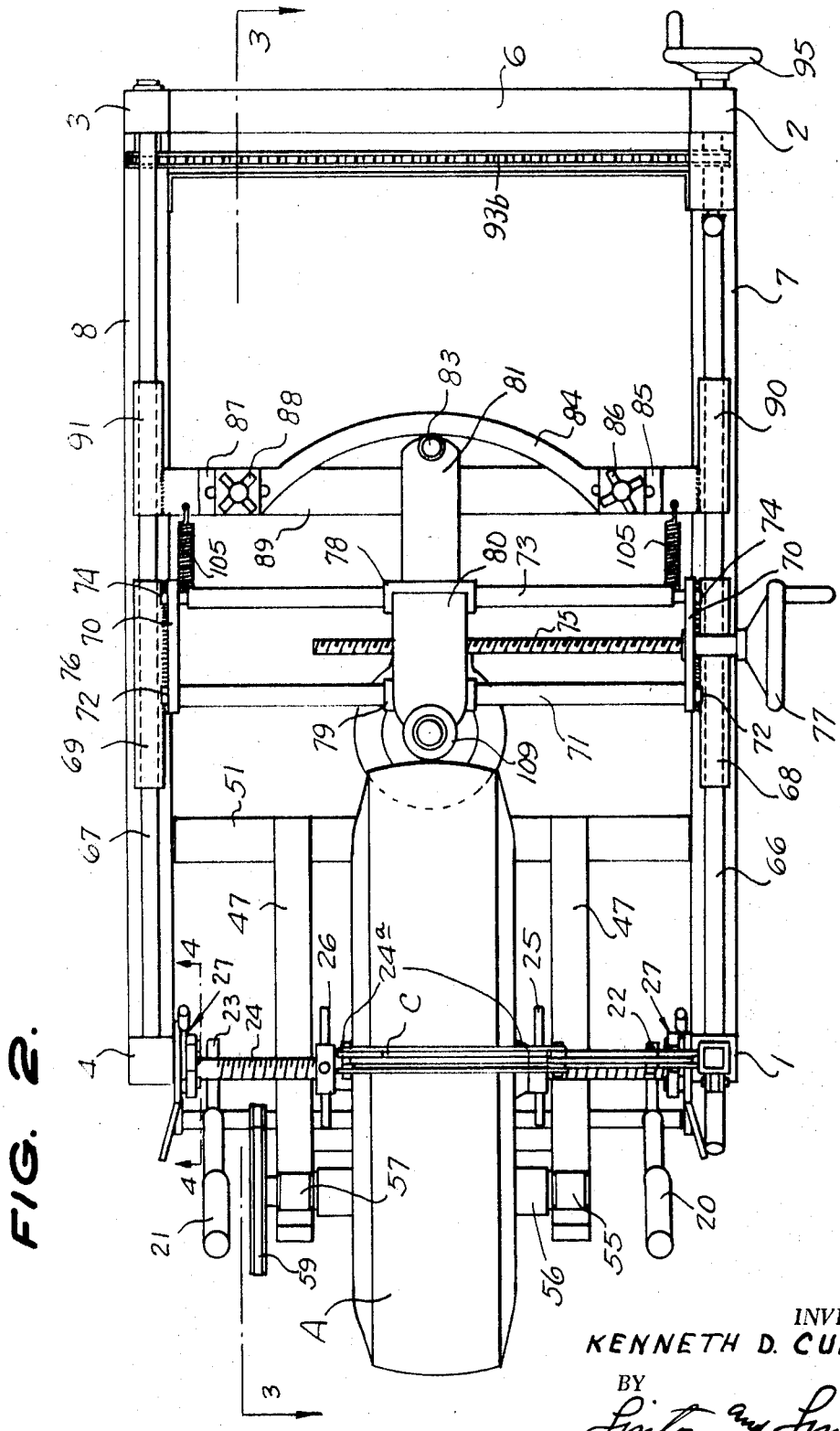

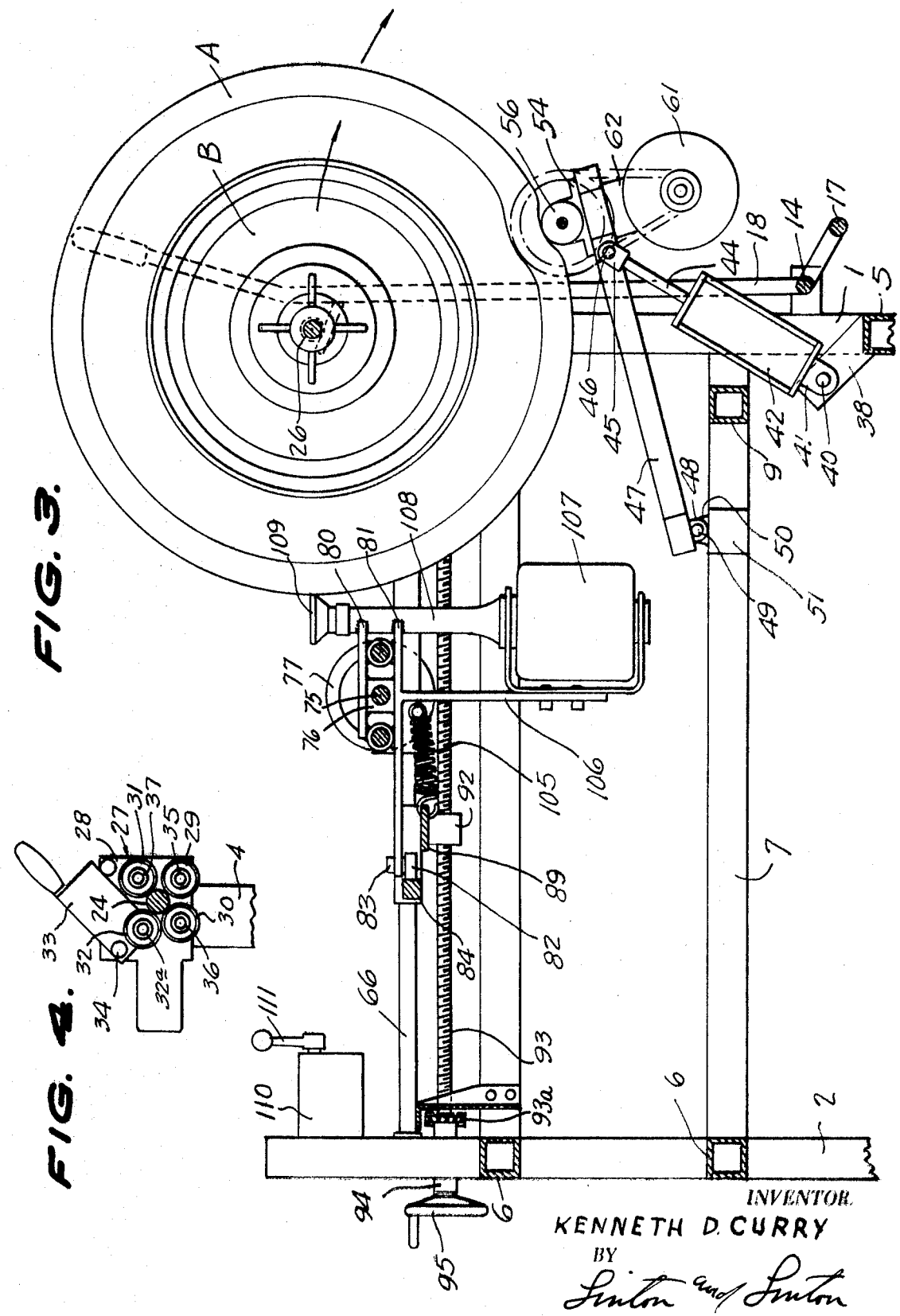

TIRE TREAD TRIMMING AND TRUING APPARATUS

DESCRIPTION

The present apparatus is for truing the tread of tires.

The principal object of the invention is to provide an apparatus for providing the entire tread of a tire with an annular configuration and with a true lateral arc which is the same completely around the tread of the tire.

A further and important object of the invention is to provide a tire-tread-truing-apparatus with means for easily and quickly mounting or dismounting a tire to be trued on the apparatus, means for flexing the tire to remove flat spots on the tread caused by the setting of the tire material and which flexing means also rotates the tire during a trimming operation thereof and further means for trimming the tire tread which is guided across the tire tread to give the entire tread a desired lateral arc.

Further objects of the invention will be in part obvious and in part pointed out in the following detailed description of the accompanying drawings, in which, FIG. 1 is a perspective view of the present tire truing apparatus as viewed from the tire mounting end thereof, FIG. 2 is a top view of the present apparatus, FIG. 3 is a longitudinal sectional view taken on line 3-3 of FIG. 2, and FIG. 4 is an enlarged detailed view taken on line 4-4 of FIG. 2.

Referring now more particularly to the drawings, wherein like and corresponding parts are designated by similar reference characters, numerals 1, 2, 3 and 4 indicate the four corner legs of the apparatus. Crossbar 5 connects legs 1 and 4, crossbar 6 connects legs 2 and 3, sidebar 7 connects legs 1 and 2, and sidebar 8 connects legs 3 and 4. Crossbar 9 connects sidebars 7 and 8. Sideplate 10 is attached to legs 1 and 2 and sideplate 11 is attached to legs 3 and 4.

Brackets 12 and 13 are attached to and extend laterally from legs 1 and 4, respectively. Rod 14 extends through said brackets and is rotatably supported thereby. Rods 15 and 16 each have an end attached to rod 14 and a foot bar 17 connecting their opposite ends providing a foot pedal. A pair of spaced apart-uprights 18 and 19 each have one end attached to rod 14 and hand grips 20 and 21 respectively mounted on their free ends. Upright 18 has a lateral hook 22 attached to an upper portion thereof and upright 19 has a corresponding hook 23.

A tire A to be trued is mounted in the conventional manner upon a wheel B. A threaded rod 24 is inserted through the center opening of said wheel and cones 24a slid on said rod 24 each against a side of the wheel center opening and then nuts 25 and 26 in threaded engagement with rod 24 are each rotated against one of said cones clamping the cones and wheel on rod 24. Tire A is then rolled between uprights 18 and 19 until rod 24 rests on hooks 22 and 23 whereupon an operator lifts handles 20 and 21 and thus, tire A until the ends of rod 24 rest in a pair of support units 27 each attached to one of the legs 1 and 4 as shown in FIG. 1.

Each of said support units 27 has a plate 28 bolted to the inner side of its leg 1 or 4 and grouped rollers 29, 30, and 31 rotatably supported on said plate by bolts 35, 36, and 37, respectively attached to said plate. A fourth roller 32 is rotatably connected to lever 33 by the bolt 32a attached to said lever. A bolt 34 attached to plate 28 extends through lever 33 pivotally supporting said lever. The ends of rod 24 when mounted on said support units 27 each rest on rollers 29, 30, and 31 as shown in FIG. 4 whereupon each lever 33 is manually pivoted to the right of FIG. 4 bringing rollers 32 onto rod 24 retaining said rod between the four rollers, pivoting levers 33 to the left of FIG. 4 releases rod 24 for dismounting tire A from the apparatus when desired whereupon foot petal 17 can be pressed downwardly and uprights 18 and 19 pivoted to the left of FIG. 1 to remove said tire A and wheel B.

Brackets 38 and 39 each have one end attached to crossbar 5 and extend on a slant upwardly and inwardly from said crossbar 5. An axle 40 extends through brackets 38 and 39 and through lug 41 attached to the bottom of a pneumatic cylinder 42. A hose 43 is attached to the bottom of cylinder 42 for supplying air or fluid therein. Piston rod 44 is attached to a piston (not shown) in cylinder 42 and extends therefrom. A bracket 45 attached to the outer end of piston rod 44 has a pin 46 extending therethrough and through a pair of angle bars 47. Each bar 47 has an extension 48 through which extends a pin 49 which also extends through one of a pair of extensions 50 attached to bar 51 as shown in FIG. 3 so that said bars 47 are pivotally attached at one end each to bar 51. A crossbar 53 is attached to and connects the sides 52 of said angle bars 47 at their opposite end portions. Bearings 54 and 57 are each attached to one of said bars 47 at said opposite end portions while a shaft 55 extends through said bearings and also through a roller 56 attached to said shaft 55. Pulley 58 is attached to shaft 55 and a flexible endless belt 59 runs around said pulley 58 and also around pulley 60 attached to the drive shaft of an electric motor 61. An inverted U-shaped bracket 62 is attached by bolts 63 to a bracket 64 attached to crossbar 53 and motor 61 is attached to the arms of said bracket 62. Wires 65 are connected to source of electrical current for operating motor 61.

A rod 66 extends between and is attached to legs 1 and 2 while rod 67 extends between and is attached to legs 3 and 4. Sleeve 68 slides on rod 66 while sleeve 69 slides on rod 67. A pair of angle irons 70 are each fixedly mounted on one of said sleeves 68 and 69. Rods 71 and 73 extend between said angle irons with the reduced ends 72 of rod 71 and reduced ends 74 of rod 73 extending through said angle irons. A rotatable screw rod 75 extends through one angle iron 70, is in threaded engagement with nut 76 fixedly mounted between plates 80 and 81 and has control wheel 77 fixedly connected on the end thereof. Sleeves 78 and 79 slide on rods 73 and 71, respectively, and plate 80 extends between and is attached to the tops of sleeves 78 and 79. A second plate 81 extends across and is attached to the bottoms of sleeves 78 and 79. A roller 82 has a stub axle (not shown) extending through plate 81 and retained by nut 83.

A bow-shaped guide 84 has slotted end portions 85 and 87 positioned on crossbar 89, while adjusting nuts 86 and 88 are in threaded engagement with bolts (not shown) extending through slots in crossbar 89 and the slots in end portions 85 and 87. Crossbar 89 has end sleeves 90 and 91 slidable on rods 66 and 67, respectively, and a pair of nuts 92 attached to the bottom thereof.

A pair of screw rods 93 are in threaded engagement with said nuts 92 and extend through bearings 94 extending through legs 2 and 3. Each rod 93 has a sprocket 93a, fixedly mounted thereon and chain 93b, extending around said sprockets COntrol wheel 95 is fixedly attached to the outer end of one of said rods 93. A spring 105 is attached to crossbar 89 and to one of said angle irons 70.

An arm 106 is fixedly attached to plate 81 and extends downwardly therefrom. An electric motor 107 is attached to arm 106 and has a drive shaft neck 108 extending upwardly with annular cutter 109 fixedly attached to the motor drive shaft for being rotated thereby. Said motor 107 is electrically connected to reversing switch 110 which is connected in turn to a source of electrical current and is operated by lever 111.

In the use of the present apparatus tire A mounted on a conventional wheel B and rod 24 is mounted on rollers 29, 30, 31 and 32 as hereinbefore described. Tire A is partly inflated, piston rod 44 is raised bringing roller 56 against the tire as shown in FIGS. 1 and 3 and motor 61 operated rotating roller 56 and thus, the tire. Such rotational contact between roller 56 and tire A will flex the tire tread eliminating flat spots on the tire tread caused by the setting of the tire on a flat surface particularly when mounted on a vehicle and allowed to stand still for some time.

The tire can then be fully inflated and while still being rotated by roller 56 can be engaged by cutter 109 to be trimmed and trued. For this latter purpose, a suitable guide 84 is placed on crossbar 89 and after being properly positioned is fastened in place by tightening nuts 86 and 87 on their bolts. Spring 105 brings roller 82 against the side of guide 84. Rotating wheel 95 on one direction moves crossbar 89 to the right of FIG. 3 pushing plate 81 and thus, cutter 109 in the same direction until cutter 109 engages the tread of tire A OPerating lever 111 causes motor 107 to rotate said cutter 109 to trim the tire tread.

Thereupon wheel 77 is rotated moving cutter 109 laterally across the rotating tire tread and roller 82 moves across guide 84 guiding cutter 109 in accordance with the shape of said guide.

When the tire tread is shaped as desired, wheel 95 is reversed, handle 111 moved to stop motor 107, piston rod 44 lowered, levers 33 pivoted to release rod 24, uprights 18 pivoted to the right of FIG. 3 to release rod 24 and then wheel B is dismounted form rod 24 whereupon the tire A is ready for being mounted on a vehicle.

A runout guage C is supported above tire A to measure the amount of run out of the tire.

The present apparatus is capable of considerable modification and such changes thereto as come within the scope of the appended claims is deemed to be a part of the present invention.

I claim:

1. An apparatus for trimming and truing a tire tread comprising a frame, means for rotatably and detachably supporting a wheel-mounted tire on said frame, a driven roller positioned for engaging the tread of the tire, means for moving said roller to and from said tire tread, a cutter support slideably mounted on said frame, consisting of rods mounted on said frame, a pair of sleeves each slideably mounted on one of said rods, a second pair of rods extending between said first pair of rods and connected to said sleeves, a plate slideably mounted on said second pair of rods, a driven cutter carried by said plate, means for moving said cutter across said tire tread being connected to said plate, a bow-shaped guide slideably mounted on said first-mentioned rods, a roller carried by said plate, resilient means tending to bring said roller against said bow-shaped guide whereby said cutter will follow the shape of said bow-shaped guide and means for moving said bow-shaped guide and thus said cutter towards and away from said tire tread.

2. An apparatus for timing and truing a tire tread comprising a frame, means for rotatably and detachably supporting a wheel-mounted tire on said frame, a driven roller positioned for engaging the tread of the tire, means for moving said roller to and from said tire tread, a support slideably mounted on said frame, a driven cutter carried by said support, means for moving said cutter to and from said tire tread, means for moving said cutter across said tire tread, a guide slideably mounted on said frame, a roller carried by said support and resilient means tending to brings said roller against said guide whereby said cutter will follow the shape of said guide, a pair of uprights pivotally connected to said frame, a hook carried by each upright and an axle supporting said tire wheel mountable on said hooks whereby said tire can be manually lifted by said uprights to said tire-supporting means.

3. An apparatus for trimming and truing a tire tread comprising a frame, means for rotatably and detachably supporting a wheel-mounted tire on said frame, consisting of a pair of support units at opposite sides on said frame, and a further roller pivotally mounted on said frame, an axle supporting said tire wheel rotatably and detachably mounted at each end on one of said plurality of rollers and retainable therebetween upon the pivoting of said further roller against said axle, a driven roller positioned for engaging the tread of the tire, means for moving said roller to and from said tire tread, a support slideably mounted on said frame, a driven cutter carried by said support, means for moving said cutter to and from said tire treads, means for moving said cutter across said tire tread, a guide slideably mounted on said frame, a roller carried by said support and resilient means tending to bring said roller against said guide whereby said cutter will follow the shape of said guide.

4. An apparatus for trimming and truing a tire tread comprising a frame, means for rotatably and detachably supporting a wheel-mounted tire on said frame, a driven roller positioned for engaging the tread of the tire, means for moving said roller to and from said tire tread, consisting of a pair of bars pivotally connected at one end to said frame and having said driven roller carried at the other end thereof, a cylinder pivotally connected at one end to said frame, a piston rod slideably extending from said cylinder and pivotally connected to said bars and capable of moving said roller to and from the tire tread, a support slideably mounted on said frame, a driven cutter carried by said support, means for moving said cutter to and from said tire tread, means for moving said cutter across said tire tread, a guide slideably mounted on said frame, a roller carried by said support and resilient means tending to bring said roller against said guide whereby said cutter will follow the shape of said guide.

5. An apparatus for trimming and truing a tire tread as claimed in claim 1 wherein said means for moving said cutter across said tire consists of a nut carried by said plate and a screw rod rotatably carried by said first rods and being in threaded engagement with said nut.

6. An apparatus for trimming and truing a tire tread as claimed in claim 1, wherein a crossbar is slideably mounted on said first rods, said bow-shaped guide is adjustably and detachably mounted on said crossbar and said roller is carried by said plate at an opposite end thereof to said cutter.

7. An apparatus for trimming and truing a tire tread as claimed in claim 6 including means for moving said guide from said support against the tendency of said resilient means to move said roller against said guide.